United States Patent [19]

Grube et al.

[11] Patent Number: 5,553,314
[45] Date of Patent: Sep. 3, 1996

[54] METHOD OF CONFIGURING A COMMUNICATION UNIT USING A WIRELESS PORTABLE CONFIGURATION DEVICE

[75] Inventors: Gary W. Grube, Palatine; Timothy W. Markison, Hoffman Estates, both of Ill.

[73] Assignee: Motorola, Inc., Schaumburg, Ill.

[21] Appl. No.: 226,808

[22] Filed: Apr. 12, 1994

[51] Int. Cl.$^6$ .................................................. H04B 1/38
[52] U.S. Cl. .......................... 455/54.2; 455/89; 379/58; 379/63
[58] Field of Search .................... 455/89, 33.1, 53.1, 455/54.1, 54.2, 56.1; 379/58, 59, 63

[56] References Cited

U.S. PATENT DOCUMENTS

| | | | |
|---|---|---|---|
| 5,155,860 | 10/1992 | McClure | 455/89 |
| 5,297,191 | 3/1994 | Gerszberg | 379/58 |
| 5,297,192 | 3/1994 | Gerszberg | 379/58 |
| 5,321,737 | 6/1994 | Patsiokas | 379/63 |
| 5,361,223 | 4/1994 | Amadon | 379/63 |

*Primary Examiner*—Edward F. Urban
*Attorney, Agent, or Firm*—Susan L. Lukasik

[57] ABSTRACT

In a wireless communication system (100), a communication unit (102) may operate therein in the following manner. At power up of the communication unit (102), the communication unit transmits an application request over a second wireless communication path (117) to a configuration device (115). The configuration device (115) determines whether this was a valid request, and if so transmits the appropriate software applications to the communication unit (102) over the second wireless communication path (117). The communication unit (102) stores the application information in volatile memory (119). Having this information stored, the communication unit (102) prepares a service request by requesting configuration information from the configuration device (115). Upon receiving the configuration information from the configuration device (115) via the second wireless communication path (117), the communication unit (102)can access the wireless system (100) via a first wireless communication path (103).

17 Claims, 2 Drawing Sheets

METHOD OF CONFIGURING A COMMUNICATION UNIT USING A WIRELESS PORTABLE CONFIGURATION DEVICE

FIELD OF THE INVENTION

This invention relates generally to wireless communication systems and, in particular, to configuring communication units for operation within such communication systems.

BACKGROUND OF THE INVENTION

Wireless communication systems are known to include a communication resource allocator, a plurality of communication units, and communication resources that are transceived via repeaters. In normal operation, an operator of a communication unit employs an input device, typically a keypad or selection switch, to select a desired system service. Upon this selection, the communication unit accesses its internal memory to determine the software application needed to execute this request. Having determined this information, a processor within the communication unit utilizes the software application to prepare an inbound signaling word (ISW) which contains the communication units identification code and the service request. This ISW is then transmitted under the control of the microprocessor which is executing the appropriate software program, over a communication resource to the communication resource allocator, or central controller. The central controller interprets the request and determines whether the communication unit is an authorized unit and whether the request is valid for this particular communication unit. If both inquiries are answered affirmatively, the central controller transmits an outbound signaling word (OSW) over a communication resource back to the communication unit. Upon receiving this OSW, the communication unit again utilizes its microprocessor and appropriate software algorithm to interpret the OSW.

As is known, technology within the wireless communication arena is advancing very rapidly. Recent technology trends are towards having the communication units being more software dependent. With this trend, it is difficult for a communication unit to keep up with the latest versions of available software. The latest versions of software provide enhanced system access features, such as telephone interconnect, dynamic regrouping, private calling, emergency processing, and a variety of other features.

When the software applications change within a communication unit, that unit often needs to be replaced because it has insufficient memory to accommodate the new software applications or, at a minimum, must be brought into a service shop to be updated with the newest version of the software applications. While this provides the communication units with the latest software applications, it is burdensome and time consuming both to the communication unit operator and the communication system operator.

One solution that is currently being used within other software driven arts, such as computers, personal electronic organizers, are to have the software applications on a disk or card. To utilize the software contained on the card, the card must be inserted into the computer, or personal organizer. While this provides the flexibility of increasing the software applications, if the device is lost, both the hardware apparatus portion and the software applications are lost. Thus, someone who finds the device has a complete working unit and may proceed to utilize that unit.

Therefore, a need exists for a method and apparatus for allowing easy updates of software applications within communication units without the burdens of prior art techniques.

DESCRIPTION OF A PREFERRED EMBODIMENT

Generally, the present invention provides a method and apparatus for operating a communication unit within a wireless communication system. This is accomplished by providing a communication unit that contains only volatile memory and a configuration device which includes the software applications needed as well as the identification codes of the communication unit. In operation, when the communication unit determines that a service request has been initiated, the communication unit transmits a configuration information request over a second wireless communication path to the configuration device. Upon receiving this request, the configuration device ascertains the appropriate information and transmits it back to the communication unit over the second communication path. Upon receiving this information, the communication unit processes it and prepares the service request. With such a method and apparatus, the present invention provides a convenient way for updating communication unit software and overcomes the possibility of losing both the device and the software card by keeping them separate.

Figure 1:
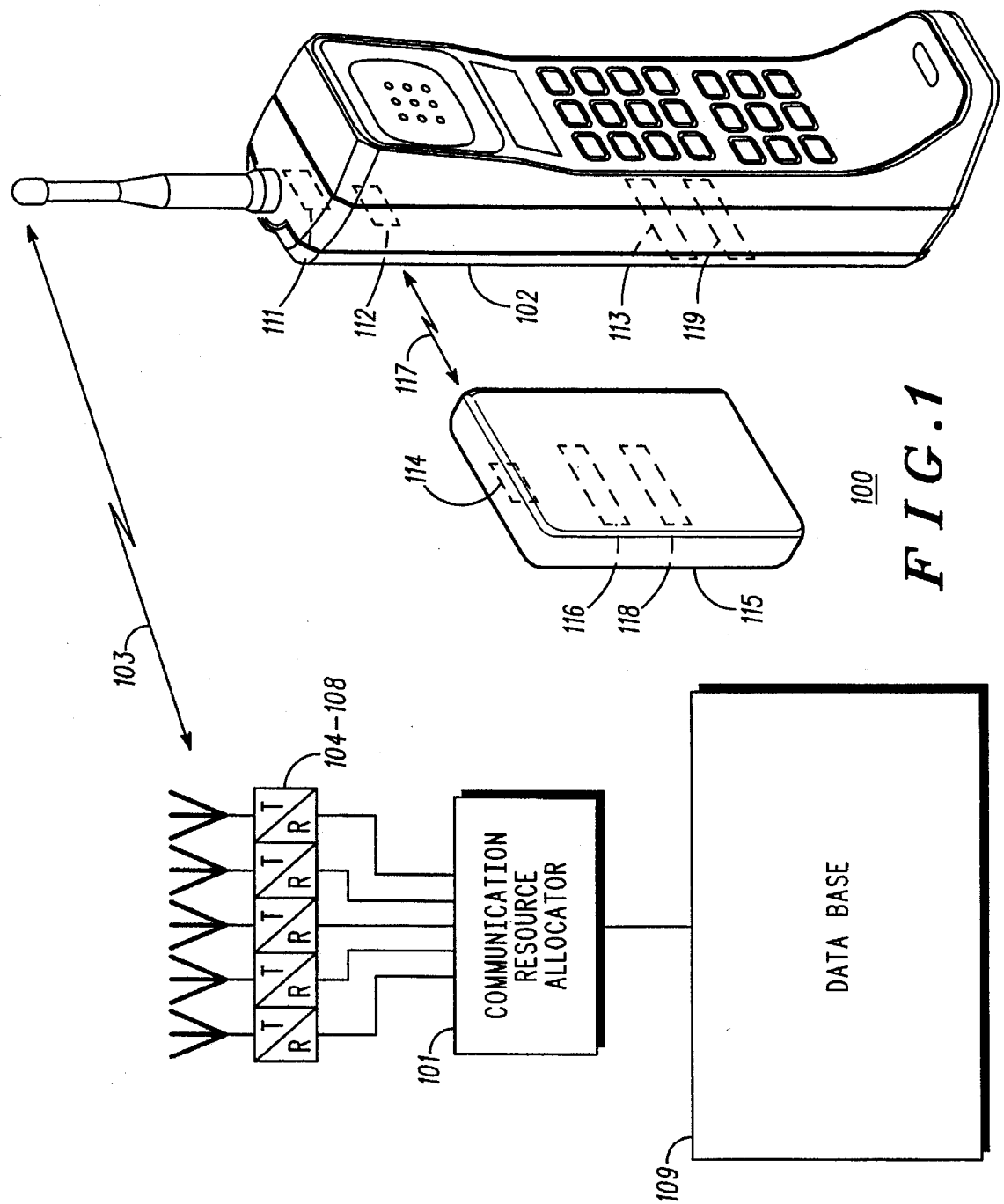
FIG. 1 illustrates a wireless communication system in accordance with the present invention.

The present invention can be more fully described with reference to FIGS. 1 and 2. FIG. 1 illustrates a wireless communication system 100 that includes a communication resource allocator (or a central controller) (101), a plurality of communication units (102), communication resources (103), repeaters (104–108) and a database (109). The communication unit (102), which may be a Motorola Sabre radio or Motorola Radius radio, includes a first transceiver (111), a second transceiver (112), a processor (113), and volatile memory (119). The communication unit (102) transceives information with the communication resource allocator (101) by transceiving information over the communication resources (103) utilizing the first transceiver (111). This is the typical manner in which a communication unit (102) transceives information with the central controller and other communication units thus no further discussion will be presented regarding the first transceiver (111).

The communication unit (102) communicates with the configuration device (115) over the second wireless communication path (117). The second wireless communication path (117) may be a RF communication path or an infrared communication path. If the second wireless communication path is an RF communication path, the frequency may be identical to the first communication path wherein the transmit powers of both the configuration device and the second transceiver are set to a very low power level such that the range between the two devices is approximately 20 feet. Alternatively, the frequency may be selected to any RF frequency that is available for commercial use. If the second wireless communication path is an infrared path, the configuration device transceiver (114) and the second transceiver (112) should include a light receptacle and light transmitter preferably a wide angle lens such that the angle of transmission may be as broad as possible.

The configuration device (115) includes a transceiver (114), a configuration information storage element (116) and an application information storage element (118). The transceiver (114) provides the configuration device (115) the mechanism to communication with the communication unit over the second wireless communication path (117). Each of these elements (116) and (118) may be any type of digital electronic storage device, for example, a RAM, ROM, EPROM, etc. The configuration information storage element (116) stores the identification codes for this particular communication unit and also the system access information for this particular communication unit. The identification codes include the communication unit's individual identification code, a subgroup identification code, and a group identification code. The system access information includes the operating frequencies of the system, a particular operating frequency that the communication unit will use, and a system identification code. In addition, the configuration information storage element (116) may also store a speed dial list for accessing target communication units for this particular unit.

With the identification code information, and the system access information being stored on the configuration card, or device, the communication unit does not need to have this information stored within it, and in the preferred embodiment does not have this information stored within.

The configuration device (115) should be manufactured in such a way as to make it readily carryable by the operator of the communication unit. For example, the configuration device (115) may be similar to a credit card which has memory stored therein provided it has sufficient memory to store the configuration information and the application information. As another example, the configuration device (115) may be manufactured within a pager package having sufficient memory to store the configuration information and the application information. To further explain how the communication unit and the configuration device operate together, consider the logic diagram of FIG. 2.

Figure 2:
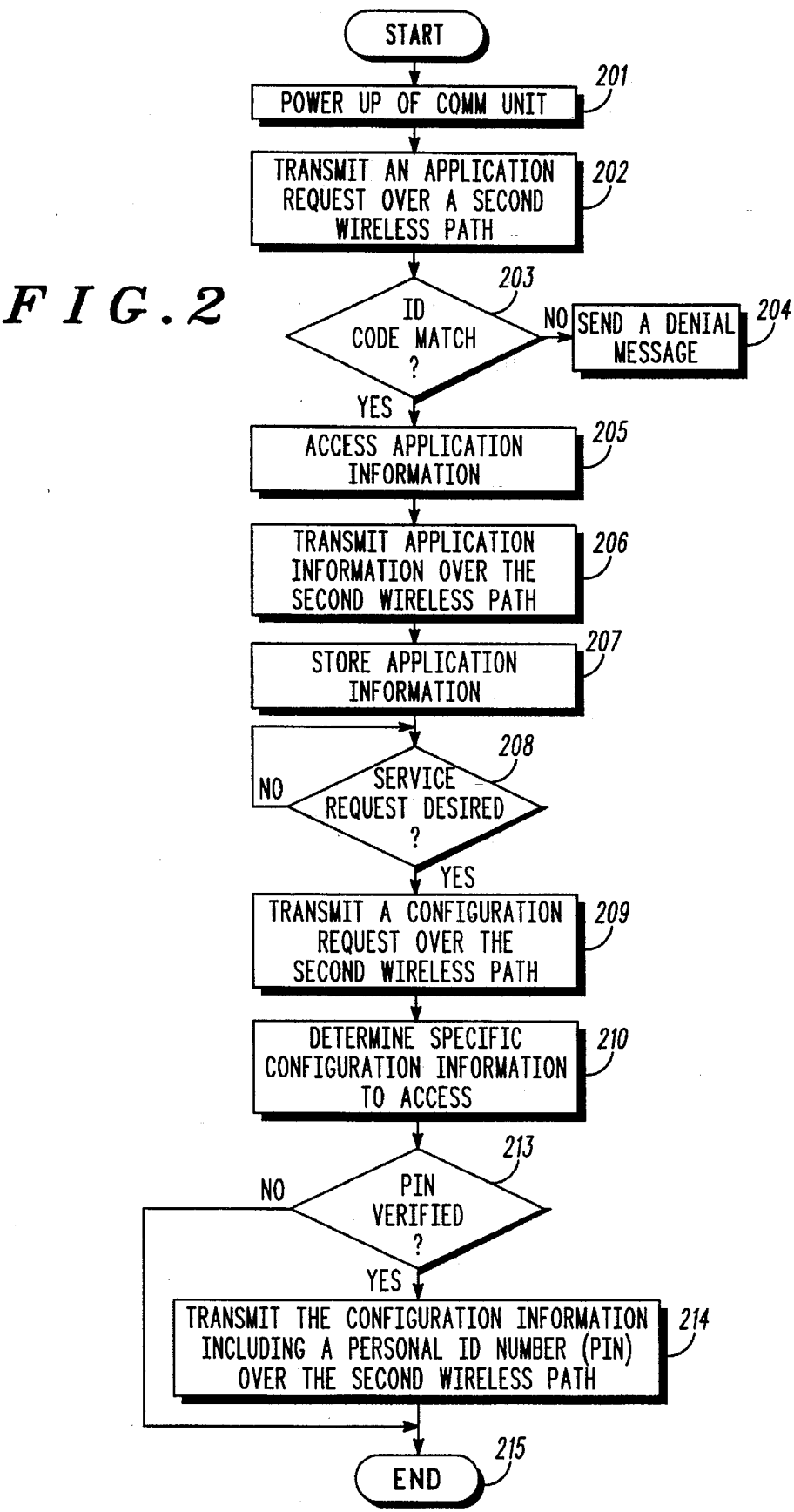
FIG. 2 illustrates a logic diagram that may be used to implement the present invention.

FIG. 2 illustrates a logic diagram that may be used to implement the present invention. At step (201), the communication unit is turned on, or powered up. Upon power up, the communication unit transmits an application request to the configuration device over a second wireless communication path (202). The application request will include a unique identification code which is unique between this particular communication unit and the particular configuration device. Upon receiving the application request, the configuration device determines whether the unique identification code matches its identification code (203). If the codes do not match, the configuration device transmits a denial message. Note that the identification code that the communication unit transmits does not have to be the identification code the communication unit uses to transmit information to the central controller. In the preferred embodiment, the identification code used to transmit between the configuration device and the communication unit will be different than the identification code used to communicate with the central controller.

If the identification codes match (203), the configuration device accesses the application information storage element to retrieve the application information (205). The application information storage element stores the software applications that this particular subscriber has purchased. For example, the software applications may be to initiate dynamic regrouping, telephone interconnect, private calling, roaming features, and other services available.

Having retrieved this information, the configuration device transmits the application information over the second wireless communication path to the communication unit (206). Upon receiving this information, the communication unit stores this information in its volatile memory (207). By storing this information in the volatile memory, when the communication unit is turned off, the software application information stored therein will be lost. Thus each time the communication unit is powered up it must access its configuration card.

With the application information stored, the communication unit waits for a service request to be initiated. When a service request is desired (208), the communication unit transmits a configuration request to the configuration device over the second wireless communication path (209). The configuration request contains the unique identification code, or personal identification number (PIN) of the unit and the configuration card. If the personal identification number of the communication unit does not match the personal identification number of the card, the configuration device will send a denial message. Assuming that the PINs match, the configuration device determines the specific configuration information needed. As mentioned above, the configuration information may be the system access information or the individual codes. Having determined which information is needed (210), the configuration device accesses the information (211) and transmits this information and the personal identification number to the communication unit over the second wireless communication path (212). The communication unit also verifies whether the PINs match (213). If the PINs do not match, the communication unit may display that the service request has been denied. If the PINs do match, the communication unit prepares an inbound signaling word (ISW) and transmits the ISW over a first wireless communication path to the central controller (214).

The present invention provides a method and apparatus for operating a communication unit in a wireless communication system. With such a method and apparatus, a communication unit without its personal configuration device will be unable to operate within the communication system. In addition, when new software updates occur, the configuration device can be readily replaced or updated without having to return or replace the communication unit. Further, problems of prior art techniques that have a memory card plug in to a device are overcome because the information in the present invention is transmitted over a wireless communication path.

We claim:

1. A communication apparatus that comprises:
   a communication unit that includes a communication processor, a first transceiver that transceives information to a communication system on a first wireless communication path and a second transceiver that transceives configuration information on a second wireless communication path;
   a wireless portable configuration device that includes a configuration information storage element and a transceiver that transceives, upon valid request from the communication unit, the configuration information on the second wireless communication path to the communication unit, wherein the second wireless communication path is a short-range wireless communication path; and
   a volatile memory storage element, disposed within the communication unit, arranged and constructed to store the configuration information received on the second wireless communication path.

2. The communication apparatus of claim 1, wherein the second wireless communication path is an infrared communication path.

3. The communication apparatus of claim 1, wherein the second wireless communication path comprises an RF communication path.

4. The communication apparatus of claim 1, wherein the configuration information comprises an identification code.

5. The communication apparatus of claim 4, wherein the identification code comprises an individual, a subgroup, and a group code.

6. The communication apparatus of claim 1, wherein the configuration information comprises system access information.

7. The communication apparatus of claim 6, wherein the system access information comprises an identification of operating frequency and a system identification code.

8. The communication apparatus of claim 1, wherein the configuration information includes a speed dial list.

9. A method for operating a communication unit in a wireless communication system comprising the steps of:
   a) ascertaining, by the communication unit, that a service request is desired;
   b) transmitting over a wireless communication path a configuration information request from the communication unit to a wireless portable configuration device, wherein the wireless communication path is a short-range wireless communication path;
   c) accessing, by the wireless portable configuration device, configuration information based on the configuration information request;
   d) transmitting, by the wireless portable configuration device, the configuration information over the wireless communication path to the communication unit;
   e) preparing, by the communication unit, the service request based on the configuration information; and
   storing the configuration information in volatile memory within the communication unit.

10. The method of claim 9, wherein the second wireless communication path comprises an infrared communication path.

11. The method of claim 9, wherein the second wireless communication path comprises an RF communication path.

12. The method of claim 9, wherein step (c) further comprises interpreting the configuration information request to determine specific configuration information to access.

13. The method of claim 9, wherein step (b) further comprises transmitting a personal identification number (PIN) as at least part of the configuration information request.

14. The method of claim 13, wherein step (d) further comprises transmitting the personal identification number (PIN) as at least part of the configuration information.

15. The method of claim 13, wherein step (e) further comprises verifying the personal identification number.

16. The method of claim 9 further comprising the step of:
   f) when the service request is valid, transmitting the service request to the wireless communication system over a first wireless communication path.

17. A method for operating a communication unit in a wireless communication system comprising the steps of:
   a) upon power up of the communication unit, transmitting over a wireless communication path an application request to a wireless portable configuration device, wherein the application request includes a unique identification code, wherein the wireless communication path is a short-range wireless communication path;
   b) verifying, by the wireless portable configuration device, that the unique identification code substantially matches an identification of the wireless portable configuration device;
   c) when the unique identification code substantially matches the identification code of the wireless portable configuration device, accessing, by the wireless portable configuration device, application information based on the application request;
   d) transmitting, by the wireless portable configuration device, the application information over the wireless communication path to the communication unit; and
   storing, by the communication unit, the application information in volatile memory.

\* \* \* \* \*

UNITED STATES PATENT AND TRADEMARK OFFICE
CERTIFICATE OF CORRECTION

PATENT NO. : 5,553,314
DATED : September 3, 1996
INVENTOR(S) : Gary W. Grube, Timothy W. Markison It is certified that error appears in the above-indentified patent and that said Letters Patent is hereby corrected as shown below:

```
Column 5, line 40 --storing the configuration--
should be --f) storing the configuration--.

Column 6, line 41 --storing, by the--
should be --e) storing, by the--.
```

Signed and Sealed this

Thirty-first Day of December, 1996

Attest:

BRUCE LEHMAN

*Attesting Officer*   Commissioner of Patents and Trademarks